US008046693B2

(12) United States Patent
Oliver

(10) Patent No.: US 8,046,693 B2
(45) Date of Patent: Oct. 25, 2011

(54) OBTAINING USER FEEDBACK ON DISPLAYED ITEMS

(75) Inventor: Huw Edward Oliver, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2432 days.

(21) Appl. No.: 10/724,318

(22) Filed: Nov. 26, 2003

(65) Prior Publication Data
US 2004/0169678 A1 Sep. 2, 2004

(30) Foreign Application Priority Data

Nov. 27, 2002 (GB) .................................. 0227613.7

(51) Int. Cl.
*G06F 3/00* (2006.01)
(52) U.S. Cl. ...................................................... 715/738
(58) Field of Classification Search .................. 715/738, 715/739, 740, 745
See application file for complete search history.

(56) References Cited

U.S. PATENT DOCUMENTS

| 5,566,291 | A | 10/1996 | Boulton et al. | 395/161 |
| 7,181,696 | B2 * | 2/2007 | Brock | 715/758 |
| 2001/0020243 | A1 | 9/2001 | Koppolu et al. | 707/513 |
| 2001/0029468 | A1 | 10/2001 | Yamaguchi et al. | 705/14 |
| 2002/0052934 | A1 | 5/2002 | Doherty | 709/219 |
| 2002/0087526 | A1 * | 7/2002 | Rao | 707/3 |
| 2005/0086188 | A1 * | 4/2005 | Hillis et al. | 706/50 |

FOREIGN PATENT DOCUMENTS

WO WO-02/056225 A1 7/2002

OTHER PUBLICATIONS

Le, Phong, et al., "A Curious Browser: Implict Ratings," *Submitted to the Faculty of Worchester Polytechnic Institute in partial fulfillment of the requirements for the degree of Bachelor Science*, 39 pages total (May 2, 2000).
Le, Phong et al—"A Curious Browser: Implicit Ratings"~May 2, 2000~pp. 1-34~http://www.cs.wpi.edu/~claypool/mqp/iii/report.pdf [Feb. 20, 2004].

* cited by examiner

*Primary Examiner* — Thanh T Vu

(57) ABSTRACT

User feedback regarding a displayed item, such as a web page, is obtained by providing a first and second transport-control elements, such as back buttons, that have the same effect for moving within or between displayable items but which have different associated semantic information. Upon activation of one of the transport-control elements, not only is the required movement effected, but data is output or stored indicative of the semantic information associated with the activated transport-control element. Thus, for example, the semantic information associated with one transport-control element can relate to a good user experience of the currently-displayed item whilst the semantic information associated with the other transport-control element can relate to a bad user experience of the displayed item. Related server arrangements and page and program code are also envisaged.

44 Claims, 14 Drawing Sheets

1000 Address of destination | 1001 Address of web page, subject of opinion |
1002 Opinion message (description) | 1003 Search engine address |

Fig. 10

1100 | Forward / back |

1101 | Text displayed |

1102 | Image identifier |

1103 | Generic positive / negative indicator |

1104 | Generic subjective / objective indicator |

Fig. 11

OBTAINING USER FEEDBACK ON DISPLAYED ITEMS

FIELD OF THE INVENTION

The present invention relates to obtaining user feedback on displayed items such as, for example, web pages.

BACKGROUND TO THE INVENTION

Increasingly, there has developed a market place of digital services which are accessible on line. For example on the internet, there are available music services such Napster® and like services, as well as video services, printing services, and many other services. One of the features of a digital market place is that suppliers and customers cannot meet face to face, and transactions are conducted electronically. Two counter parties to a transaction cannot easily gain any measure of how much to trust each other. In particular, there is an asymmetry of information between the service provider and the customer concerning the basic elements of a business relationship including trust.

The service provider will have invested in their web site, and provide information to the customer concerning the service, possibly with some free samples of electronic data. On the other hand, the customer provides little information to the service provider concerning the customer's requirements.

How to maintain trust and reputation in the market place is a known economics problem, and various writers have addressed the issue in the prior art. For example workers such as Akerlof (1970) have published several papers, one of which is entitled 'the market for lemons', in which the impact of customer information in the second hand car market is discussed, and which concludes that if customers do not have information about the quality of goods, they will not be able to tell the difference between good and poor quality goods or services, and the price will tend to the lowest price, which in turn encourages producers to produce the lowest quality and cheapest goods/services. Conventionally, there are two approaches to dealing with degradation of the market. A first approach, is to standardize a product or service, so although the product or service may not be top quality, it is of reproducible quality. The second approach, is to improve the reputation of the business, so the customers have confidence in the business, and the business can charge higher prices. Customers are expected to accept whatever quality that business produces.

Consequently, information about the reputation of a business is useful in controlling the market. However, this type of information is absent in an electronic commerce environment.

It is known for businesses to try and improve their reputation by various mechanisms, including sponsorship of charitable events, and advertising. Customers may gain an appreciation of the reputation of a business through the visibility of those charitable events and through advertising, by word of mouth, or by trusted third parties, for example consumer quality magazines. None of these prior art methods apply directly to an online environment.

Problems in a digital services market include how to establish a reputation of a business online, and how to collect online information relevant to the reputation. A presently unsolved problem is how to collect reputation information with minimum of effort on the part of the supplier of the information.

The reputation information can be used to make decisions about which member to deal with in future, and is therefore valuable information. Reputation data is generated in a distributed manner without central management, and is therefore a frequently discussed service in distributed computer networks. Prior art solutions include filling in a feedback form, in which a user answers questions about their usage of a particular service provided on line. However, the ineffectiveness of feedback forms is well known. Completing a feedback form involves a user typing text into a set of text data entry boxes on a visual display screen.

Referring to FIG. 1 herein, there is illustrated a prior art system of a plurality of service providers 100, 101 communicating over the internet 102 with a plurality of users each having a user computer 103, 104.

Individual service providers may provide facilities within their websites to collect customer feedback data from a plurality of users.

Referring to FIG. 2 herein, there is illustrated schematically one instance of a user computer 200 and one instance of a service provider server computer 201, showing a prior art browser installed in the user computer, and a web server application installed in the service provider computer, which forms the basis of many internet based e-commerce services in the prior art.

The user computer 200 comprises one or a plurality of communications ports 202 for communicating over an internet link 203 with the service provider; a processor 204; a memory device 205; a data storage device 206, for example a hard disk data storage unit or the like; a user interface 207 including a visual display monitor, a keyboard, and a pointing device such as a mouse, trackball or the like; an operating system 208 of known type, for example Unix®, Linux®, or Windows® operating system; a web browser 209 for example a web browser comprising the operating system such as the known Windows Internet Explorer, or a separate browser such as a NetScape® browser; and one or more applications programs 210.

The service provider server computer 201 comprises a communications port 211 for communicating with the one or more user computers; a processor 212; memory 213; a data storage device 214, for example an array of hard disks, such as a RAID array or the like; an operating system 215, for example a Unix®, Linux®, or Windows® operating system; one or more databases 216, which may contain content data subject of a service provided by the server computer; one or more service applications 217, for enabling the server computer to provider a service; a and web page generator 218 for generating a web site, which can be viewed using the browser 209 of one or more user computers.

Feedback data relating to a customers experience is collected by the website, by a user filling in a form served by the website application and viewable on the users browser. Referring to FIG. 3 herein, there is illustrated schematically a view of a prior art browser as displayed on a screen on a prior art user computer. The browser comprises a back icon 300 enabling a user to step back one stage from a current web page which is being viewed in a view area 301, and a forward icon 302 enabling the user forward one or more pages from a presently viewed website. The back and forward icons are examples of user-activatable transport-control elements for moving the displayed page view within and/or between pages.

Referring to FIG. 4 herein, there is illustrated schematically a logical diagram of prior art operation of a prior art search engine 400 responding to a plurality of queries from a plurality of user browsers 401-404. Each browser sends a query message to the search engine requesting a website or requesting a search. The search engine sends replies back to the browsers, listing search engines and providing websites and web pages in response to the queries.

In the above prior art systems, reputation information can be handled by virtue of filling in response questionnaire forms presented on line at the browser. For example the E-bay® website allows users to submit a form which describes whether their transaction was good or bad for that user.

However, the internet currently has several features which makes it difficult to collect detailed information about websites. Firstly, download times for information from websites, although improving, are still quite slow, and are not instantaneous. Users are reluctant to enter into any long form filling processes on screen, because of the communications delay between the users computer and a website, sometimes over a slow and unreliable legacy communications link. Secondly, users are pre-disposed not to give detailed information, because it takes time, and users of the internet wish to use their time more effectively whilst on line. Thirdly, there is a general reluctance to give out information on the part of users, where there is no direct benefit to the user. Users are likely to give information as part of a transaction, but otherwise where there is no transaction, users are reluctant to give information for security and privacy reasons.

Therefore, a technical problem is how to make it easy for users of electronic services to provide reputation information, so that every time a user makes an interaction with a service provider, information concerning the reputation of the service provider can be collected.

Another problem is to overcome the reluctance of users to voluntarily give information about a website or service online, where the questions asked may be viewed as intrusive or unnecessary to a user of a service.

SUMMARY OF THE INVENTION

According to a first aspect of the present invention there is provided a method of obtaining user feedback relating to items displayable on a device, the method comprising:
  displaying on the device:
    a view of a said displayable item,
    a first activatable transport-control element with associated first semantic information, and
    a second activatable transport-control element with associated second semantic information that is different from said first semantic information; and
  responding to activation of a said transport-control element both by moving the displayed item view within or between displayable items and by storing or outputting data indicative of the semantic information associated with the activated element, the item-view move that is effected as a result of activation of a said transport-control element being the same whichever of said elements is activated.

According to a second aspect of the present invention, there is provided a method of obtaining feedback data from a plurality of users of one or more on line services, said method comprising:
  displaying a set of transport-control elements for transporting between display views comprising said online service; and
  for each said transport-control element, presenting an associated information describing a type of experience which said user has encountered.

According to a third aspect of the present invention, there is provided a user device arranged to obtain user feedback relating to items displayable by the device, the device comprising:
  a display; and
  a display control arrangement for displaying on the display:
    a view of a said displayable item,
    a first activatable transport-control element with associated first semantic information that is indicative of a user's experience in respect of a displayed item, and
    a second activatable transport-control element with associated second semantic information that is indicative of a user's experience in respect of a displayed item and is different from said first semantic information;
  the control arrangement being arranged to respond to user activation of a said transport-control element both by moving the displayed item view within or between displayable items and by storing or outputting data indicative of the semantic information associated with the activated element, the item-view move that is effected as a result of activation of a said transport-control element being the same whichever of said elements is activated.

According to a fourth aspect of the present invention, there is provided a computer program product for causing a computing entity to operate to:
  display on the computing entity:
    a view of a displayable item,
    a first activatable transport-control element with associated first semantic information, and
    a second activatable transport-control element with associated second semantic information that is different from said first semantic information; and
  respond to activation of a said transport-control element both by moving the displayed item view within or between displayable items and by storing or outputting data indicative of the semantic information associated with the activated element, the item-view move that is effected as a result of activation of a said transport-control element being the same whichever of said elements is activated.

According to a fifth aspect of the present invention, there is provided a web page stored on a storage medium, the web page comprising:
  page content data,
  a first activatable transport-control element with associated first semantic information,
  a second activatable transport-control element with associated second semantic information that is different from said first semantic information, the transport-control elements and their associated semantic information being intended for display by a browser along with said page content data; and
  control script code for causing a browser, when displaying the web page, to respond to activation of a said transport-control element both by moving the displayed page view within or between web pages and by storing or outputting data indicative of the semantic information associated with the activated element, the page-view move that is effected as a result of activation of a said transport-control element being the same whichever of said elements is activated.

According to a sixth aspect of the present invention, there is provided a service provider computer entity adapted for providing an online accessible service, said computer entity comprising:
  a web server application capable of serving website pages to a plurality of user browsers; and
  a message generation component for causing the passing to a said browser requesting a website page, information items to be associated with respective ones of a plurality of transport-control elements of the browser, respective ones of said information items describing a positive aspect and a negative aspect of an experience of the website page served by said computer entity.

Other aspects according to the invention are as described in the claims herein, and the scope of the invention is limited only by the features of the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 10 illustrates schematically an example of an opinion message sent from a user computer to a web server computer describing a user's opinion of a web page served by the web server computer;

FIG. 11 illustrates schematically sub-fields of an opinion message describing types of information which are sent from the user computer to the web server computer;

DETAILED DESCRIPTION OF THE BEST MODE FOR CARRYING OUT THE INVENTION

Figure 1:
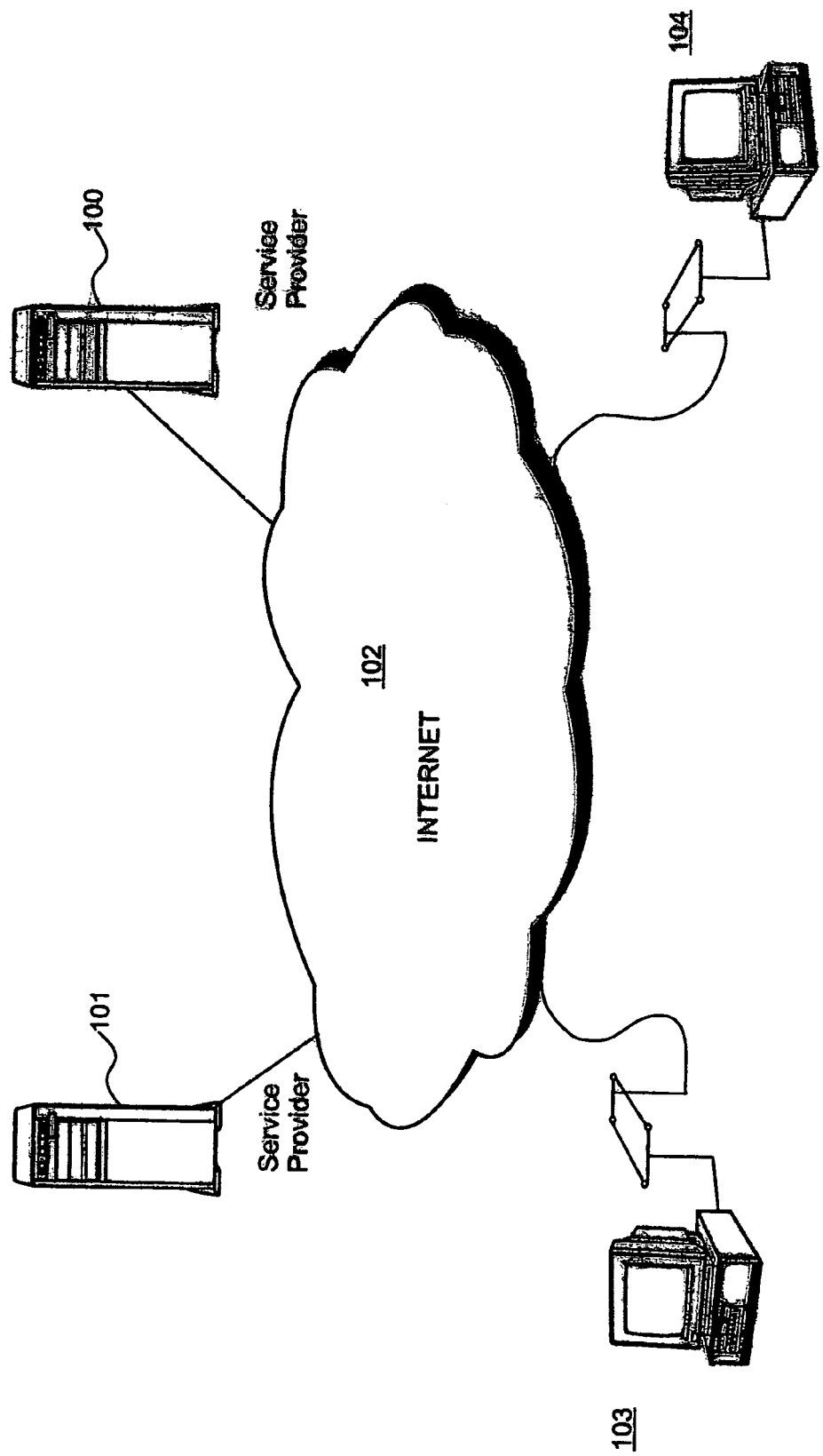
FIG. 1 illustrates schematically a prior art e-commerce environment having a plurality of service provider computers and a plurality of customers operating user computers for viewing websites and accessing electronic services over the internet.
Figure 2:
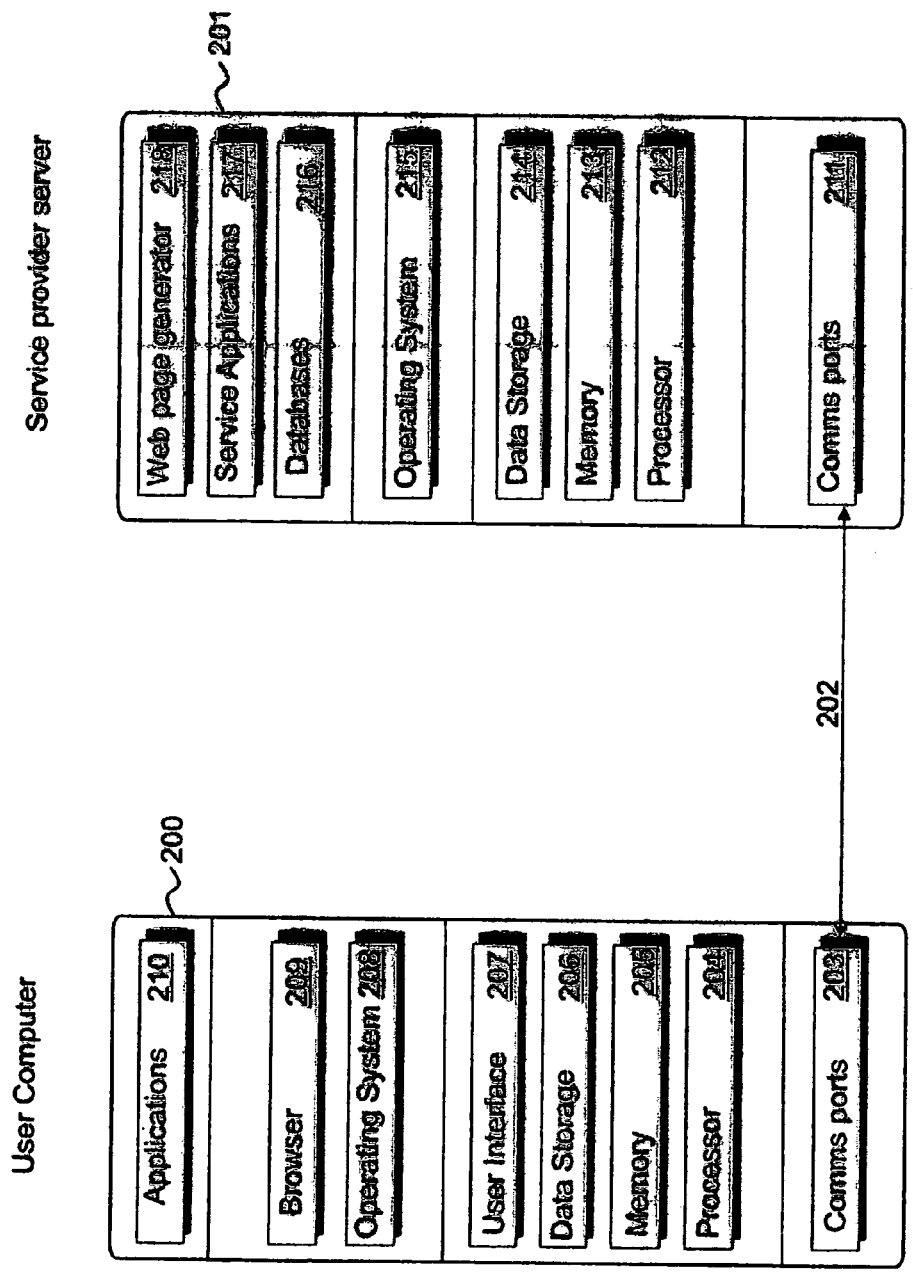
FIG. 2 illustrates schematically components of a prior art user computer equipped with a prior art browser and a prior art service provider computer providing prior art service applications and content via a website to the user computer.
Figure 3:
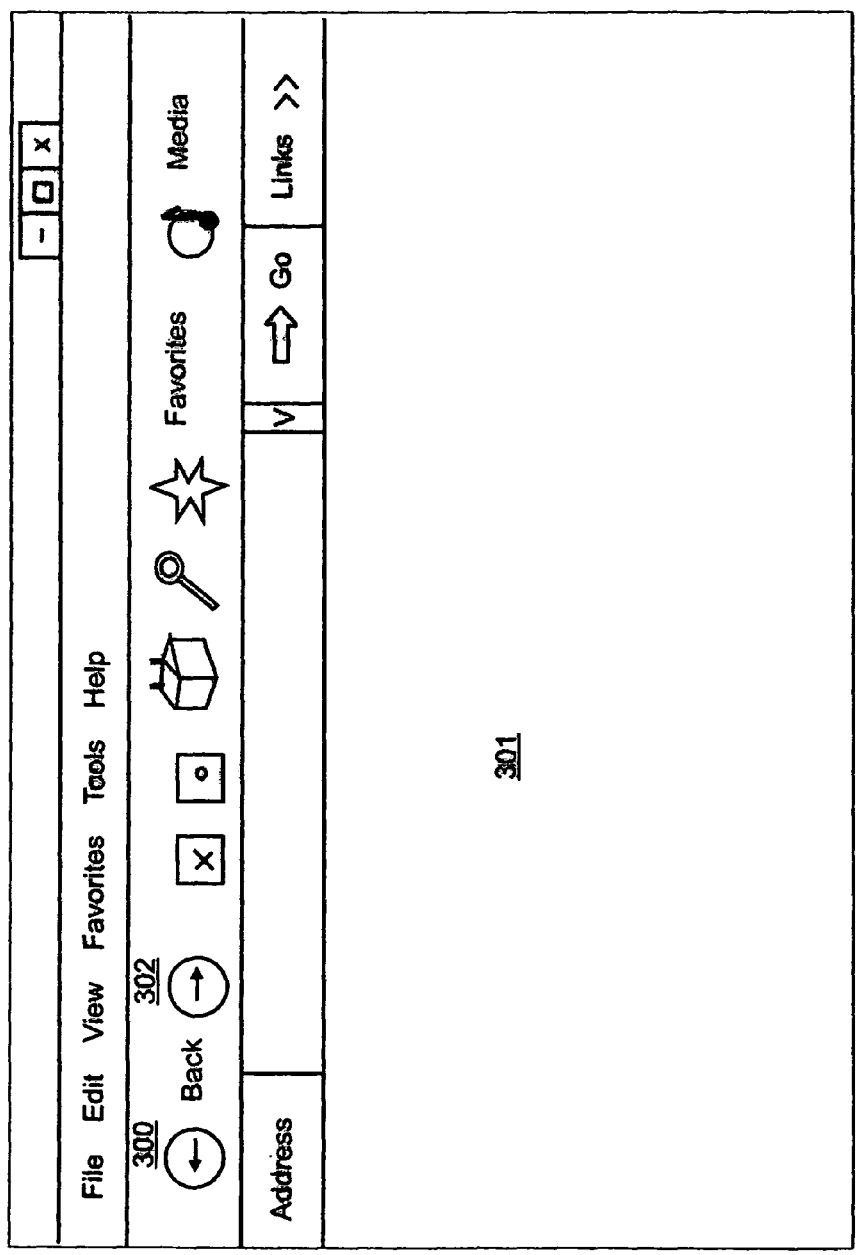
FIG. 3 illustrates schematically a screen view of a prior art browser.
Figure 4:
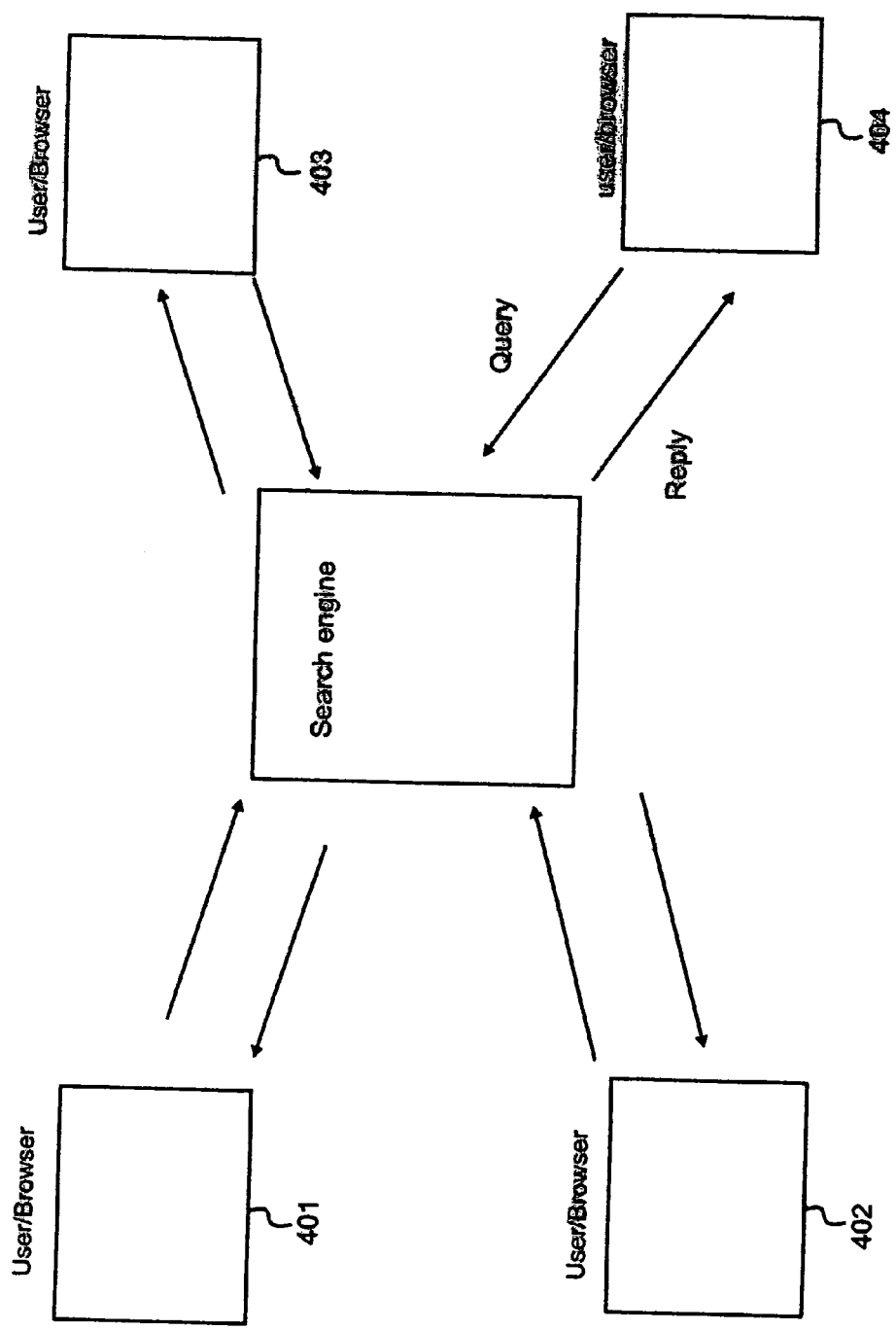
FIG. 4 illustrates schematically a logical layout of a prior art centralized search engine system, in which a central search engine provides a search service to a plurality of browsers of a plurality of user computers.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

One object of specific implementations of the present invention is to allow service providers, vendors and/or buyers to establish a reputation for themselves, in an electronic commerce environment, and to provide electronic facilities for allowing development of a reputation in an electronic services market.

Specific implementations according to the present invention aim to collect data concerning usage of information and data accessed via a web browser.

Data collected can be of various types, and in particular:
 User opinions about the quality of material accessed via a web browser.
 Data describing an effectiveness of the website structural design.

The above data types represent a measure of a user's satisfaction in her experience of using a website. A 'reputation' of a website can be determined from a cumulative knowledge of one or a plurality of users' satisfaction of experience when using the website.

Specific implementations aim to collect 'reputation' data, being data describing a general estimate of past behavior of a member of an internet community. The member of the community can be any type of member, but would most typically be a service provider providing a service to a business represented by a web site or e-commerce site on the internet.

Specific implementations according to the present invention provide for a mechanism for collecting and publishing on a discrete 'reputation system', opinions about the quality of material accessed via a web browser. The information is collected almost without effort on the part of the supplier of the information, i.e. the user of a web browser, by refining the 'back' and 'forward' transport-control elements—herein referred to simply as transport icons—seen on browsers and/or on web pages into two transport icons with semantics which the user can easily recognize and become accustomed to using routinely, without significantly impacting on the ease of usage of a web browser or web site.

Different types of information can be collected by providing modification of the 'back' and 'forward' transport icons seen on browsers and/or on web pages by dividing each of the back and forward icons into two icons, having semantics which describe the experience of a user for the service or website being viewed.

In the context of this specification, the term 'semantic information' means, a sign, symbol, logo, icon, text label or the like which is visually displayable and represents a meaning. Semantic information may comprise one or more sememes (also sometime called semantemes), which are minimum units of meaning.

Examples of the type of semantics which may be applied to the transport icons include, for the back transport button icon:
  Quality of service semantics such as;
    Back; this is high quality material
    Back; this is low quality material
  Semantics describing the relevance and/or browsing effectiveness of a website or service to the user, may include:
    Back: I found what I wanted
    Back: I didn't find what I wanted
Similar semantics can also be applied to the forward transport button icons.

Transport button icons can also be modified to provide collection and publishing of information describing effectiveness of a website in a World Wide Web scenario. Browsing effectiveness data can be used to:
1. Provide information to future would-be browsers of a site
2. Provide feedback to the creators of a website describing the effectiveness of their website structural design.

Collected semantic data may be directed at providing the following information types;
  user relevance data—specifies the relevance of a website content to a user;
  quality of service/customer satisfaction information—measure the quality of service provided by an operator of a website, and overall customer satisfaction of a website user;
  website navigation data (browsing effectiveness)—provides information on whether a website is easy to user or navigate, or difficult to use or navigate.

The above information types maybe further processed in order to gain a measure of a 'reputation' of the website. In the broadest sense, the reputation of a website may include an underlying reputation of a service provider of the website. However, due to the nature of collecting the semantic data, the reputation information is more likely to describe in particular the reputation of the website, rather than any pre-existing reputation of a service provider or business operating the website, since activation of the transport icons is collected at a time when a website is being viewed or accessed either directly, or through a web browser therefore, there reputation is likely to attach to the website itself, and its technical layout, technical operation, and content.

The information is collected almost without effort of the part of the end user, by recording the frequency and statistics of usage of the transport icons having different semantic labels.

In general, according to a specific method of the present invention there are provided processes of:
  collection of semantic data describing one or a plurality of user's experience of using a website;
  storage and/or making available the semantic data as a service to one or a plurality of service providers or users;
  analysis and filtering of the semantic data to provide information which is of users to user and/or service providers.

Figure 5:
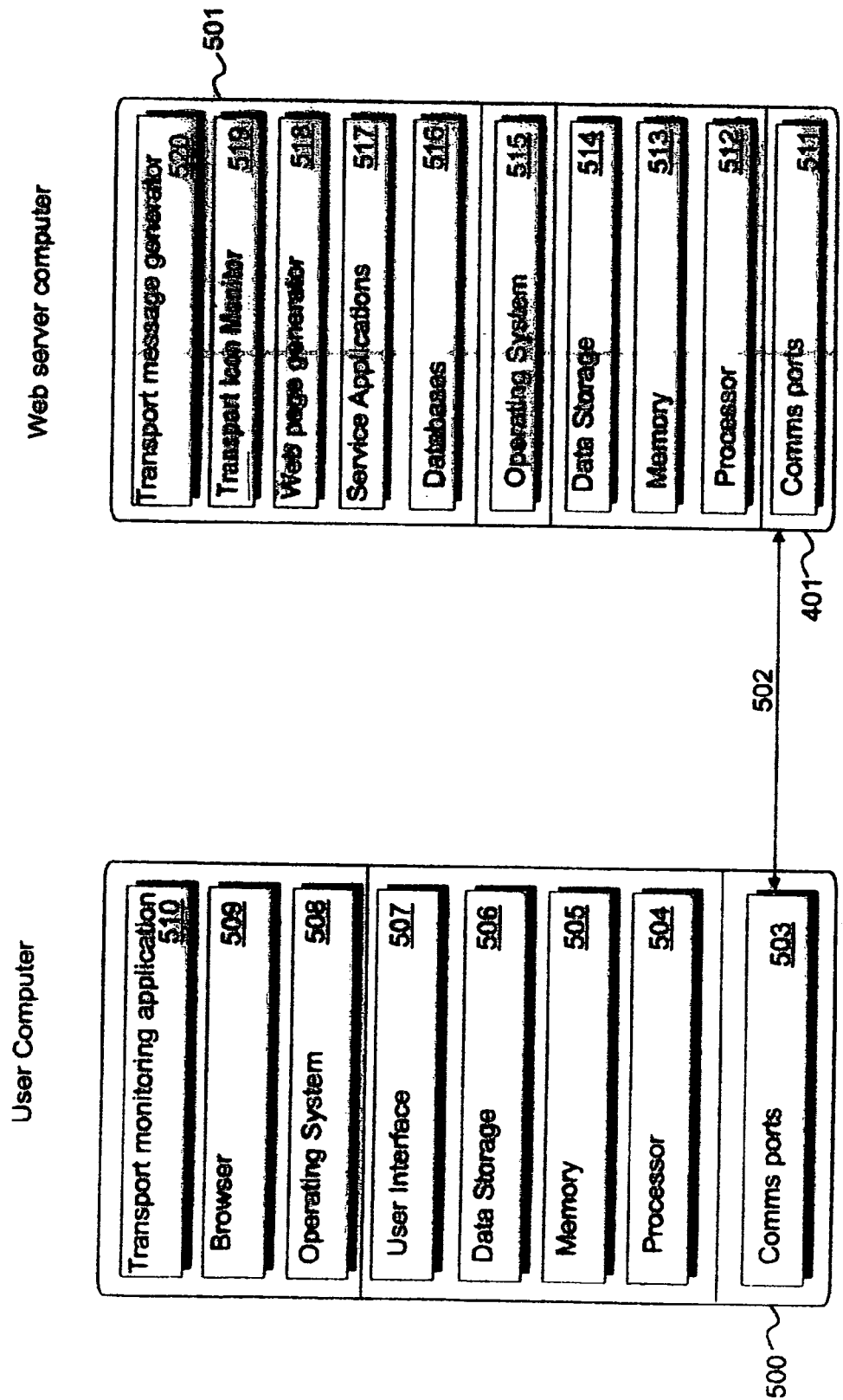
FIG. 5 illustrates schematically a user computer having browser functionality according to a specific implementation of the present invention, and a web server computer having monitoring capabilities according to a first specific implementation of the present invention.

Referring to FIG. 5 herein, there is illustrated schematically a first specific implementation according to the present invention, comprising a user computer 500 and a web server computer 501 communicating via a communications link 502, in which the user computer and web server computer contain components for implementing collection and transfer of information concerning a user's experience of a website, from the user computer to the web server computer.

The user computer comprises a set of communications ports 503; at least one data processor 504; a memory 505 associated with a processor; one or more data storage devices 506, for example a hard disk drive unit; a user interface 507 including a visual display unit for displaying views, a keyboard and a pointing device such as a mouse; an operating system 508, for example the known Unix®, Linux®, or Windows® operating systems; a web browser 509 for browsing the internet; and a transport monitoring application 510 for collecting data concerning a user's experience of a website or web page found by the browser 509.

The web server computer 501 comprises one or more communications ports 511 for communicating with a plurality of user computers; a data processor 512; a memory device 513, for temporary storage of data associated with a processor; a data storage device 514, for example a RAID array; an operating system 515, for example the known Unix®, Linux®, or Windows® operating systems; one or more databases 516 providing content for a service provided by the web server computer; one of more service applications 517 for supporting a service provided by the web server computer; a web page generator 518, associated with the service applications, for serving web pages to a plurality of user computers over the internet; a transport icon monitor 519 for monitoring usage of transport icons by a plurality of users at a plurality of user computers; and a transport message generator 520 for generating transport messages for sending out with web pages to a plurality of user computers, the transport message specifying the information content to be displayed adjacent to a set of transport icons presented on a plurality browsers operated by a plurality of said user computers, when viewing web pages served by the web server computer.

The transport monitoring application 510 can be implemented as program code comprising a separate application loaded into a prior art user computer, for modifying operation of a prior art browser, or can be included within a browser as an upgrade. The browser itself, may be provided as part of an operating system.

The transport message generator 520 and transport icon monitor 519 can each be implemented as separate applications loaded into a web server computer 501. Alternatively, the transport message generator or transport icon monitor can be provided as program code incorporated within a service application, or a web page generator. It would be appreciated by the person by the skilled in the art that the functionality provided by the transport message generator and transport icon monitor can be implemented in a variety of different ways as program code within either a web server computer, and/or a user computer.

Figure 6:
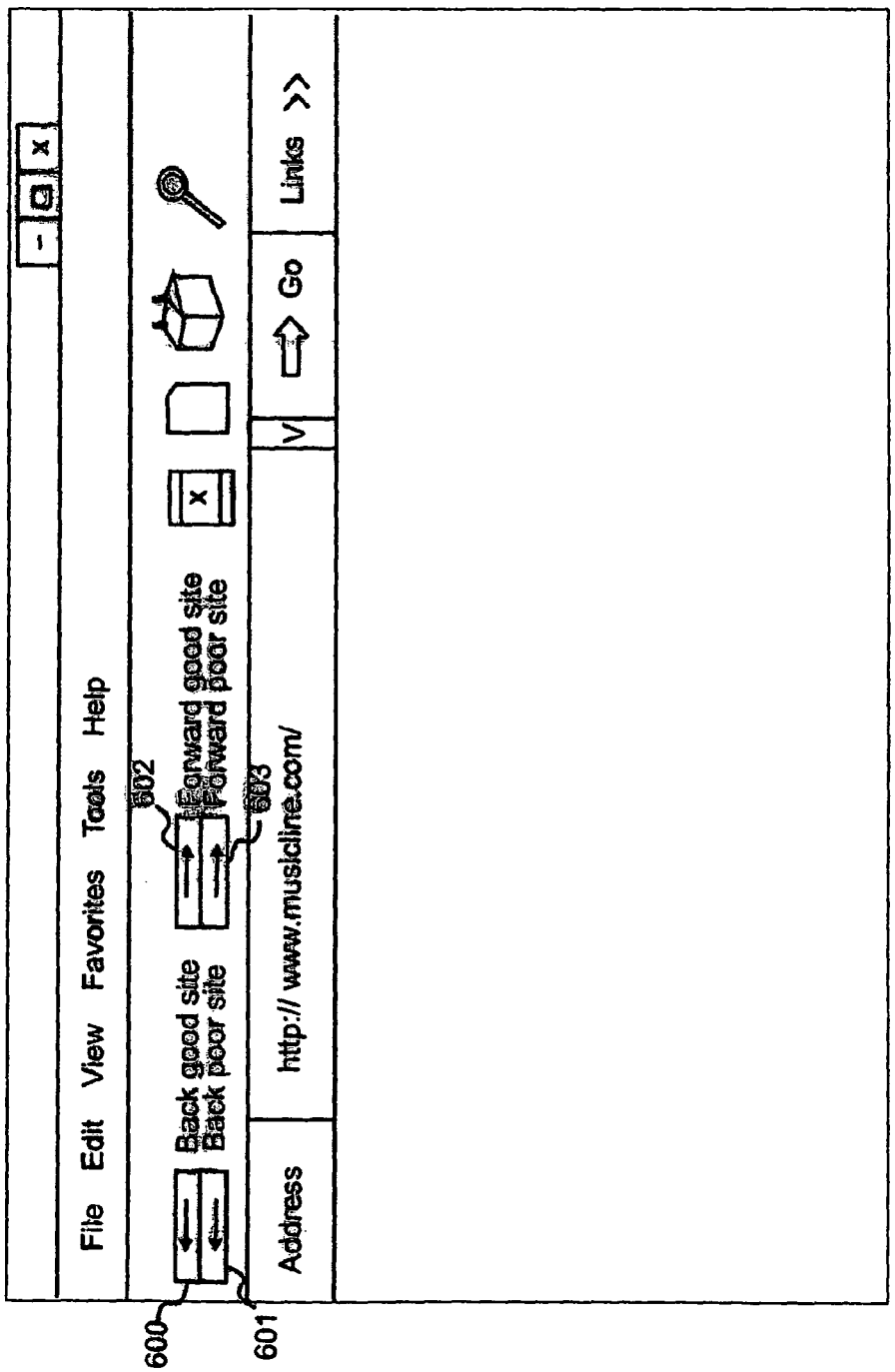
FIG. 6 illustrates schematically a screen view of a browser having transport icons according to a first specific embodiment of the present invention.

Referring to FIG. 6 herein, there is illustrated schematically a screen view of a web browser according to a first specific implementation of the present invention, including a modified back button and a modified forward button.

The web browser comprises a plurality of prior art web browser features as are known in the art, and additionally, a first back transport icon 600, which a user activates to go back a page, if they have had a good experience with a website currently being viewed; a second back transport icon 601, which a user activates to go back a page, when they have a poor or unsatisfactory experience with the website currently being viewed; a first forward transport icon 602, which a user activates to move forward a page when they are having a satisfactory or good experience with the website; a second forward transport icon 603, which a user activates to move forward a page, when they are having an unsatisfactory or poor experience with the website currently viewed.

In the first specific implementation, the back and forward icons are provided as part of the browser functionality, rather than as part of the functionality of a website page being viewed. However, the information collected through the browser concerning the user's experience of a website being viewed is accessible by the website being viewed.

Labeling of the back and forward icons can determine the type of information which is being collected. Examples of the label text can be varied, and selected to suit the information type which a service provider wishes to collect. Examples of information labeling include the following:

Good/bad—this provides a general overall indication of whether a user is having a good experience or a bad experience with a particular website or page Good site/poor site—the information collected here is whether the user considers that the website being viewed is a good site, or a bad site.

Found what I want/didn't find what I want—this information indicates whether the user found what they were looking for on the website, or didn't find what they were looking for on the website.

Happy smiling face/sad smiling face—the information is not presented as text, but as a pair of complementary graphic icons, which subjectively test the users general attitude towards the website, but without specifying any particular feature or specific question about the user's experience.

The information labeling on the transport icons can range between being objective and subjective, depending upon the actual text string or icon graphic set which are used to convey the information as to which transport icon to use.

Similarly, icons or text questions can be used on the two forward icons, 502, 503 in the same manner, to pose a subjective or an objective question, or to generally gauge the attitude of the user, depending upon the information conveyed next to the two forward icons.

Figure 7:
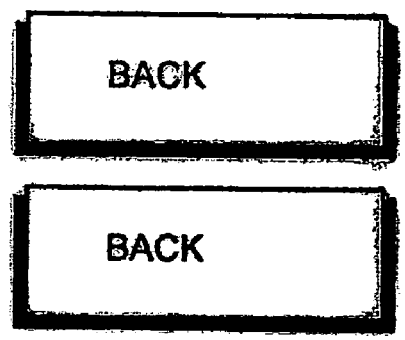
FIG. 7 illustrates schematically a pair of back transport icons of a first and second type according to a generic implementation of the present invention.

Referring to FIG. 7 herein, there is illustrated schematically a pair of back icons, wherein a first back icon 700 is associated with a first text information, and a second back icon 701 is associated with a second text information. The text information may be user selected. In the best mode implementation, the first and second back icons are presented on screen as close to each other as possible, so that it is just as easy or difficult for a user to activate one icon as the other. If the icons are placed spaced apart on the screen, then a user may habitually prefer one back icon to another, by virtue of its easier to find location, or by virtue of the ergonomics of moving a pointing device such as a mouse on a screen.

However, by placing the two back icons as close together as possible, variations due to user habit in manipulation of a pointer icon across a screen, visuality and ease of spotting the icon by a viewer can be cancelled by making these equally applicable to either icon.

Similarly, for moving a forward page, the two forward icons are presented similarly as the two back icons.

Figure 8:
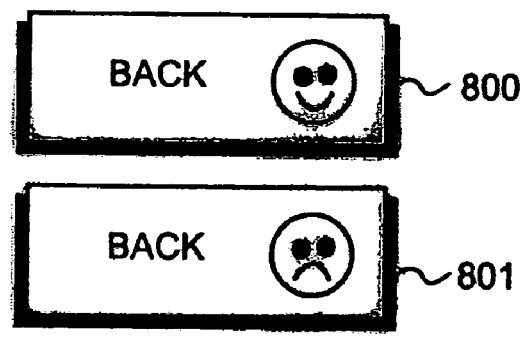
FIG. 8 illustrates schematically a specific example of a pair of back icons having a graphical information display according to a second specific embodiment of the present invention.

Referring to FIG. 8 herein, there is illustrated schematically a pair of back transport icons, where a first back transport icon 800 is identified with a first semantic icon having a subjective semantic, in this case, a happy smiling face icon, and a second back icon 801 is presented with an adjacent second semantic icon having a subjective semantic icon, in this case, a sad face.

Text or logo information types can be pre-set to elicit either an objective or a subjective response from a user. For example, if a user has genuinely had a bad experience using a website of a service provider, for example because the service provider did not deliver on time, then that is quite an objective measure of satisfaction, because most persons would agree that failure to deliver on time is an objective measure. However, if a person did not find what they were looking for at a website, and are dissatisfied, that is a subjective measure, since the website may be very good for certain types of goods or service, but perhaps not the particular goods or service which the user wished to find.

In general, objective measures of satisfaction include those parameters which would generally be regarded by most people to apply to the website or service provider itself, irrespective of the individual characteristics of a user. Subjective performance measurements are those which are user dependent, and for which the same level of performance of the website could be regarded differently by each of two or more users.

The data provided by the transport icons can be interpreted by the website in various ways, and may provide information as to how the website is presented on one or more search engines. For example, if on a search engine, a person is searching for information about furniture, and types in the word 'bedroom' into the search engine, sites which appear on the search engine, found from using the word 'bedroom' may include other sites, such as pornography sites. The user may click on links provided by the search engine, to mistakenly access the pornography site. The user may then activate a back transport button, indicating that they are not satisfied with the website found. This information can be used by the operator of the pornography website, to asses the performance of the search engine with which their website is registered. By monitoring the number of page back transport operations which occur on the home site of the pornography website, the operator of the pornography website can interpret this as being a number of users who have found the wrong site, and can review their relationship with the search engines with which they are registered as a result of that information.

By collating collected opinion data from many users over time, received from browsers equipped according to specific implementation of the invention herein, a web site operator can gain an overall impression of the effectiveness of their website, and hence the reputation of their business as presented on line. Web site operators can use the accumulated data to make modification to their websites, and then test their websites in an online environment, to see if the modified website has improved opinion data fed back from a plurality of users, equipped with browsers having transport icons as described herein.

Figure 9:
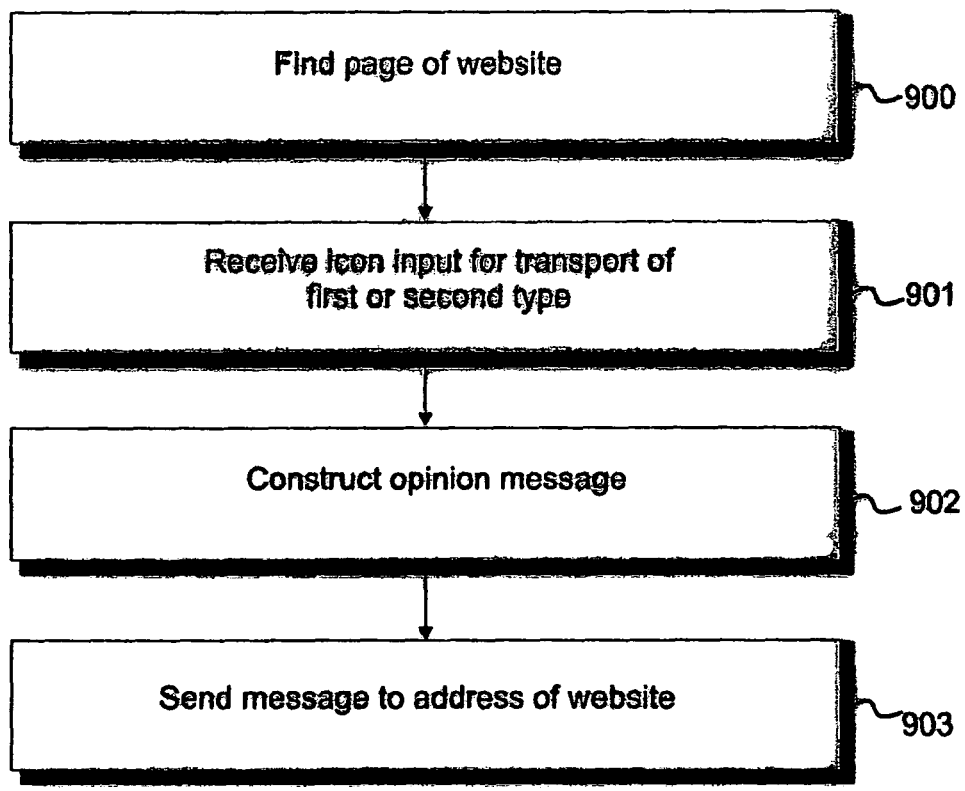
FIG. 9 illustrates schematically process steps carried out by a user computer for finding and accessing a website, and providing feedback messages to the website concerning a user's opinion of the website.

Referring to FIG. 9 herein, there is illustrated schematically process steps carried out by the browser component of the user computer for collecting opinion data describing a user's opinion of a website, and forwarding that data to the website. In process 900, the browser finds a page of a website, in conventional manner. In process 901 the browser receives a user input by user activation of a transport icon (for example, by clicking on it with a mouse), to either move a page forward or a page back from a currently displayed page. The icon can be of first type, that is a generally favorable opinion by the user, or of a second type, that is of a generally unfavorable opinion of a user. In process 902, an opinion message is constructed, describing the type of transport icon which was selected by a user, the web page to which that transport icon related; and in process 903, the web browser sends the opinion message to the website whose page was displayed at the time when the transport icon was activated by the user.

Referring to FIG. 10 herein, there is illustrated schematically an example of an opinion message sent from a browser to a website, when a user operates a transport icon as described above. The opinion message comprises a first field 1000 containing the address of the destination website which is collecting the feedback information; a second field 1001 which contains the address of the page of the website which the user was viewing, immediately prior to activating the transport icon, and which is therefore the subject of the user's opinion; a description field 1002 containing a description of the users opinion, as defined on the browser by the information presented adjacent to the transport icon which was activated; and optionally, a search engine address 1003 which identifies the search engine which was used to find the website by the browser.

Referring to FIG. 11 herein, there is illustrated in more detail the description field. The description field 1001 may comprise various sub-fields including a direction field 1100, indicating whether a forward transport icon or a back transport icon was selected; a text displayed sub-field 1101, containing the text information displayed next to the transport icon (if any); an image identifier field 1102 containing data describing a particular graphics image displayed adjacent to the transport icon (if applicable); a positive/negative indicator sub-field 1103 containing data describing a generic overall positive or negative categorization of the transport icon activated by the user; and a subjective/objective sub-field 1104 containing generic information as to whether the text information displayed, or image identified next to a transportation can be categorized as an objective measure of satisfaction or a subjective measure of satisfaction.

Figure 12:
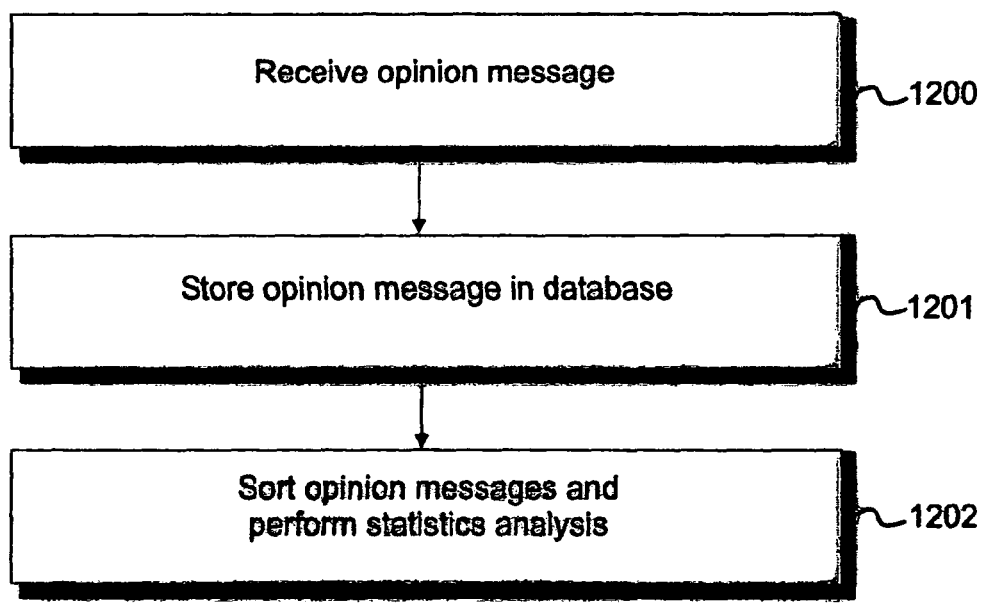
FIG. 12 illustrates schematically process steps carried out by a web server computer upon receiving a feedback message from a user computer.

Referring to FIG. 12 herein, there are illustrated schematically process steps carried out by a web server on receiving an opinion message from a web browser. In process 1200, the web server receives an opinion message from a web browser which is viewing a web page served by the web server. In process 1201, the web server stores the received opinion message in a database. In process 1202, the web server may apply an analysis program to a plurality of stored opinion messages in the database, for analyzing the results of many opinion message received from many different users using many different web browsers.

Figure 13:
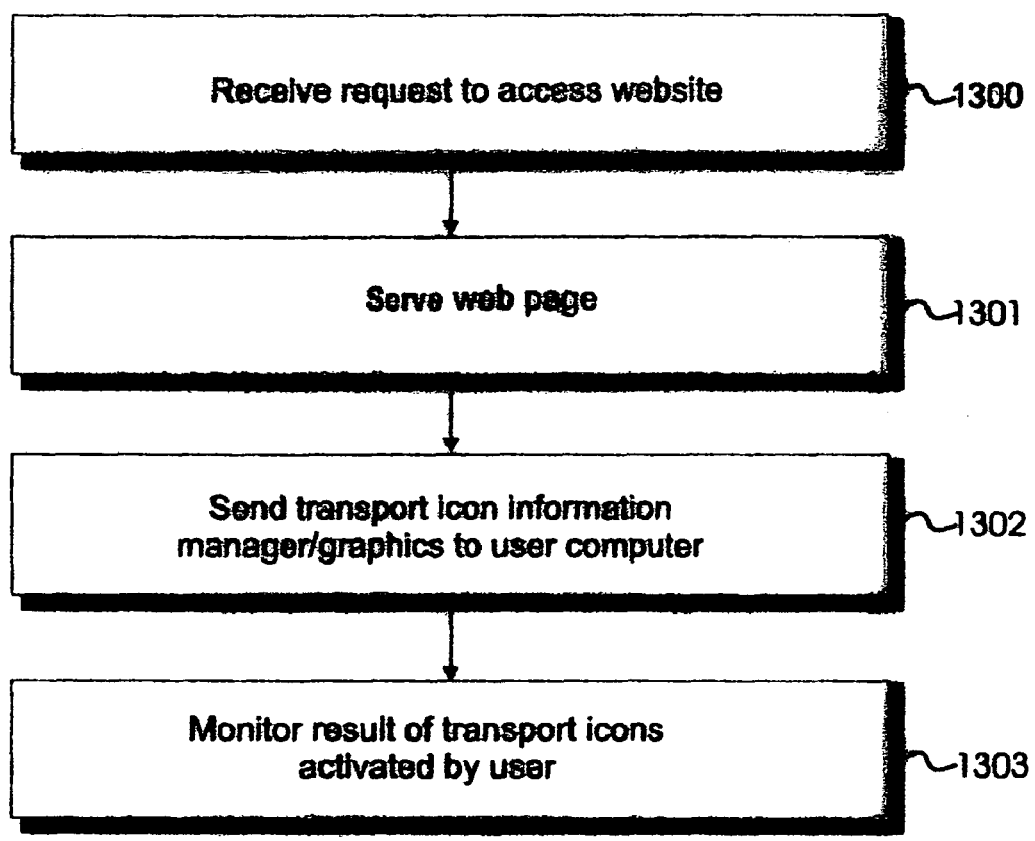
FIG. 13 illustrates schematically process steps carried out by a web server computer for launching a web page, and for setting the types of information which are presented on a set of transport icons displayed by a web browser at a user computer, to enable the user computer to send feedback messages to the web server computer.

Referring to FIG. 13, herein, there is illustrated schematically process steps carried out by the web server computer when a user computer requests to access web pages server by the web server computer. The process shown in FIG. 13 is carried out for each of a plurality of users, every time a user accesses a service or website served by the web server computer.

In process 1300, the web server receives a request to access a website or service provided by the web server, from a browser of a user computer. In process 1301, the server serves a web page which can be viewed by the user computer. In process 1302, the web server generates a transport icon information, and sends an information label in the form of a text message or a graphic, for each of a back transport icon of a first type and a second type, and for each of a forward transport icon of a first type and a second type. The corresponding respective information messages or information graphics, are sent to the user computer. The web server computer has control over the information in the message or graphic, and can select these from a library of messages, depending upon which parameters the operator of the web server computer wishes to monitor. In a simple implementation, the web server computer may be pre-set to launch only one type of message, however in a more sophisticated implementation, a selection of messages may be provided, and the transport message generation application 520 of the web server-computer may provide a user interface enabling an operator of the web server computer to change the text message to change graphics information which is displayed immediately adjacent the transport icons on the web browser. In process 1303, the web server computer monitors incoming opinion messages from the web browser of the user computer, indicating how a user is navigating through the website, and whether the user is satisfied or dissatisfied with the service provided by the website, by monitoring the back and forward transport icons, and whether a type 1 back icon or type 2 back icon, or type 1 forward icon or type 2 forward icon has been activated by the user. The web server computer collects and collates the received opinion messages and may perform analysis on a large number of such received messages from a plurality of users.

Figure 14:
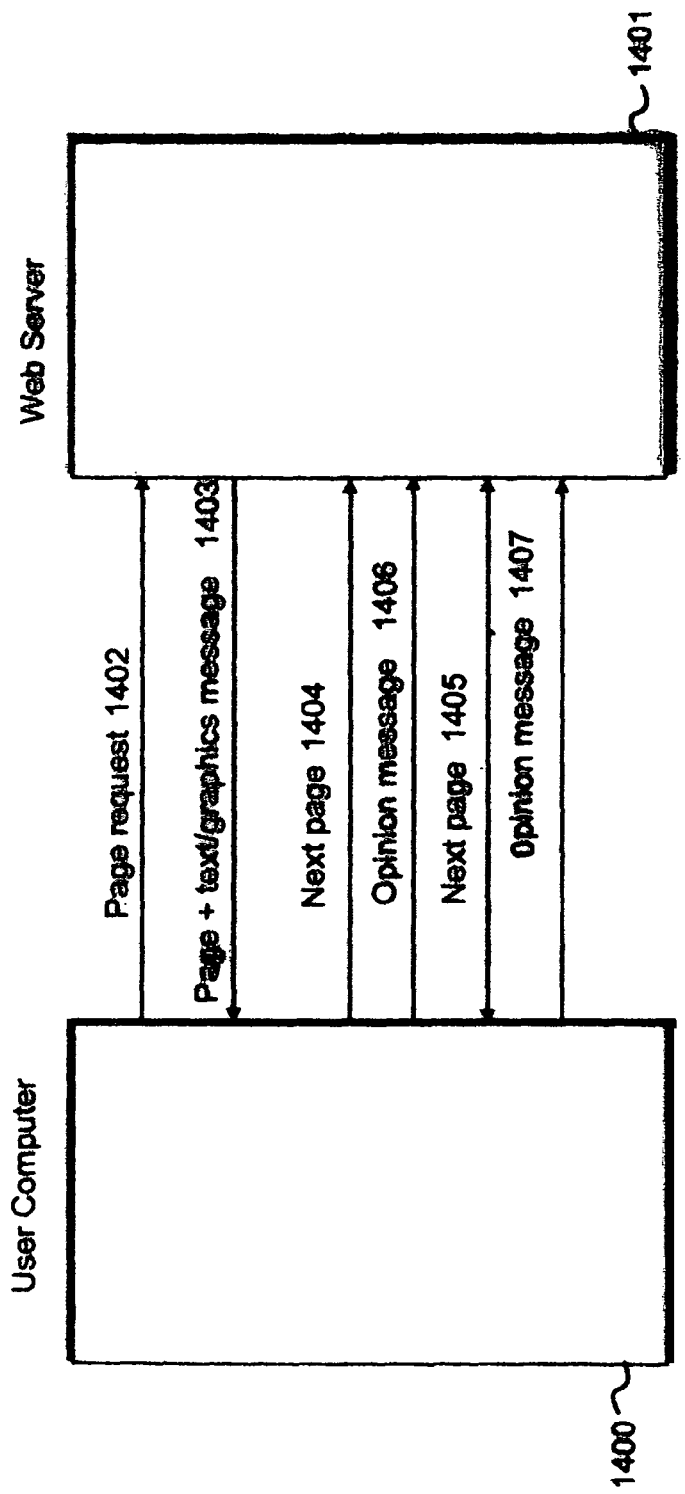
FIG. 14 illustrates schematically an interaction between a user computer and a web server computer for collecting and monitoring feedback information concerning a user's opinion on usage of a service provided by the web server computer.

Referring to FIG. 14 herein, there is illustrated schematically an example of an interaction sequence between a user computer having a web browser and a web server computer 1401. A user computer 1400 searches the internet to find a website provided at web server 1401. The browser at the user computer sends a page request 1402 to the web server requesting serving of a page. The web server serves the page and sends a icon information text/graphics message 1403 to the user computer. The text/graphics message contains a text string and/or a graphics icon which is to be presented alongside first and second back icons and first and second forward icons, in order to label those transport icons as displayed on the web browser of the user computer. The user may navigate the website accessing pages of the website, or transporting back out of the website. Further pages are requested by the web browser by sending a next page message 1404, which is responded to by the web server computer by serving a next page 1405. Each time the user requests a next page, they must do so by activating a forward icon, and they are obliged to select either a forward icon of the first type (positive) or the second type (negative). The appropriate icon results in an opinion message 1406 being generated by the user computer and sent to the web server computer. To exit a website, the user may activate a back icon of either the first type of second type. The back icons are each labeled with a text information or graphics information, describing whether that back icon is of a positive experience type or a negative experience type. Activation of a back icon results in a final message 1407 being sent to the web server computer with a corresponding opinion which is collected by the web server computer, and indicates whether the user has had a positive experience or a negative experience of that particular web page or website.

Labeled transport icons are broadly categorized into two types: type 1 being an icon which displays information confirming a positive experience by the user, and type 2, which conveys information describing a negative experience by a user.

The specific methods of the invention described herein may apply equally to centrally managed networks, and peer to peer networks. One example of a centralized system will now be described, based on a search engine Referring to FIG. 15 herein, there is illustrated a centralized reputation service system, embodying the invention, in which a search engine 1500 provides reputation services to a plurality of user computers 1501, 1502 in respect of a plurality of web servers 1503-1505.

Figure 15:
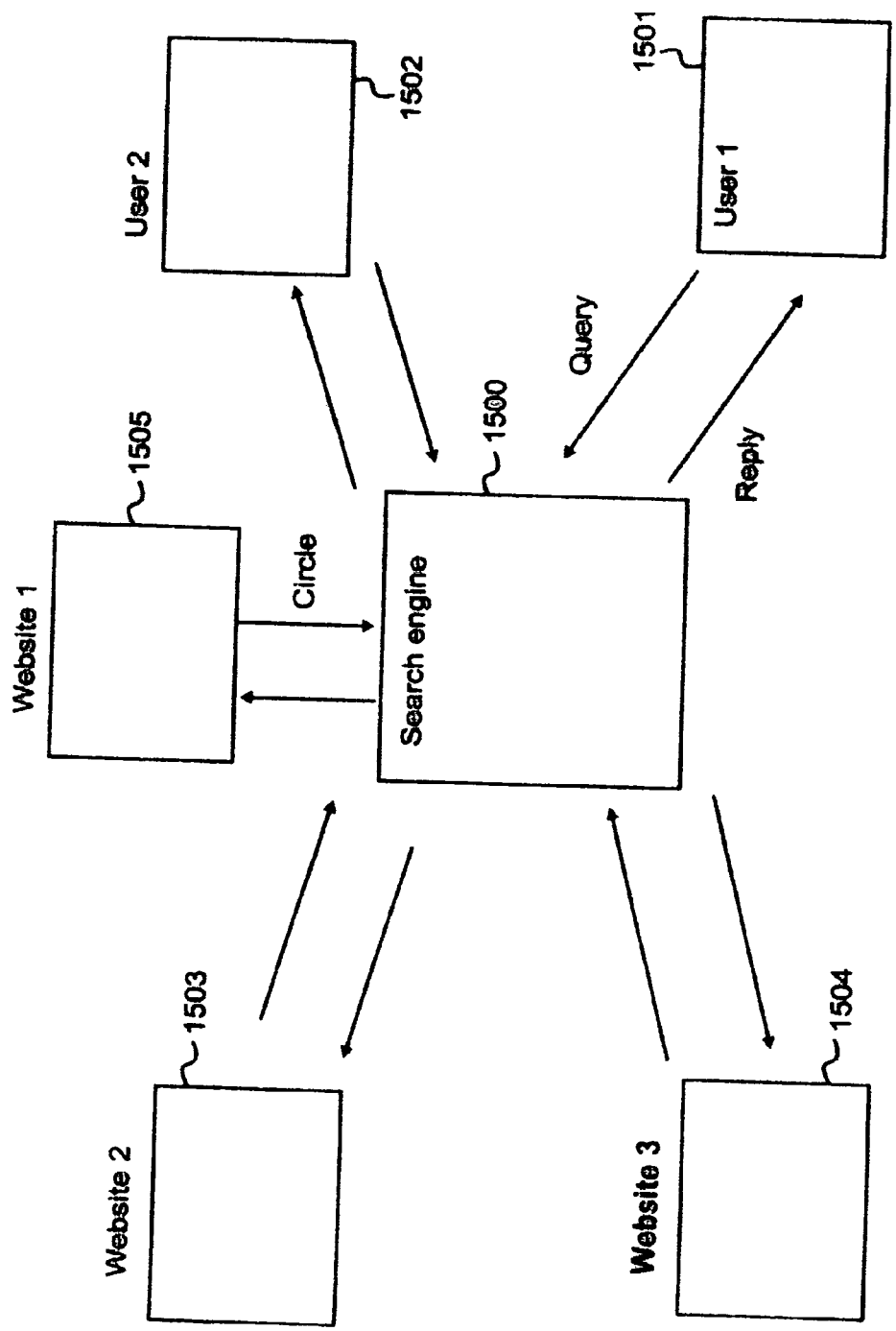
FIG. 15 illustrates schematically operating of a plurality of user computers and a web server in a centralized reputation service environment, where collection of reputation information is controlled by a computer entity which hosts a search engine.

For a centrally managed reputation service, such as shown in FIG. 15, a user would typically access the search engine 1500 using their browser and type a search term into a search form returned by the search engine. By way of example, the search term could be the word 'chairs'. The search engine would have links to many other computers operating other websites and would have indexed the contents of these websites. The search engine responds to submission of the input search term by looking for website links associated with the term.

Thereafter, the search engine returns an HTML page for viewing by the browser at the user computer, with the found links to other websites. In the present example, the returned web page comprises two frames, namely a top bar frame and a main frame—the returned search results are displayed in the main frame. The top bar frame is used to display reputation-collecting transport icons and associated semantic information (similar, for example, to the icons 600-603 illustrated in FIG. 6)—thus, the transport icons are, in this embodiment, provided in a web page rather than as part of the browser.

The user then decides whether to follow a returned link to another website. Upon the user following one of the links, the indicated page is displayed within the main frame of the page originally provided by the search engine, leaving the top bar frame, with the transport icons, in place. When the user clicks on one of the transport icons, a script included in the search-engine-provided web page carries out the required navigation operation and sends reputation information back to the search engine, the reputation information describing the user's experience of using the website viewed in main frame.

Figure 16:
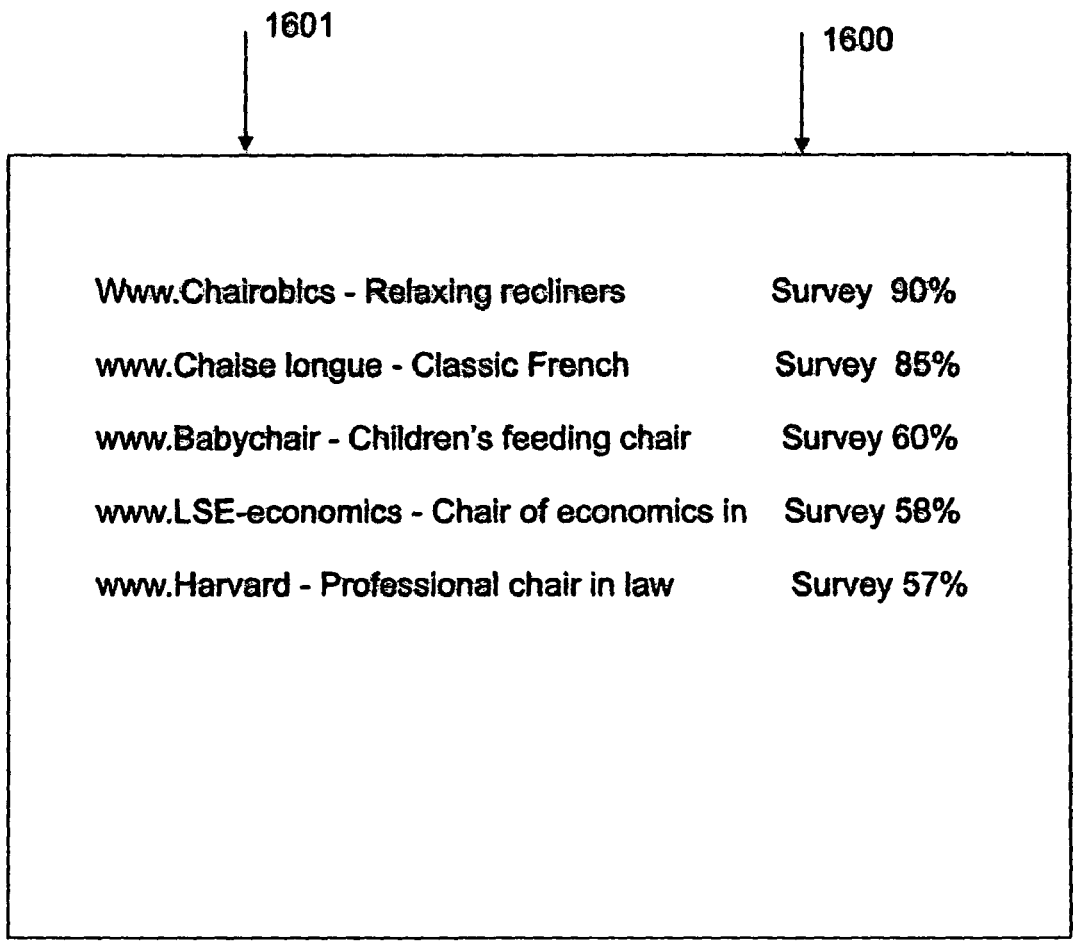
FIG. 16 illustrates schematically a HTML page served by a search engine, viewable by a user computer, showing a plurality of web sites graded in order of reputation rating.

Referring to FIG. 16 herein, there is illustrated schematically the search results display visible on a user's browser in the main frame of the page returned by the search engine in response to the query 'chairs'.

The semantic information which has previously been collected by the search engine could be displayed along with a link, enabling the user to select links on the basis of their reputation orderings, in the case where the search engine stores reputation data locally concerning a plurality of websites. A reputation rating may be displayed on the user's browser along with a link, so that at the point of selection, the user can select websites based upon reputation data collated from the collective experiences of many previous users of that website. In this centralized system, the search engine acts as a centralized trusted third party, monitoring the reputation of a plurality of websites, and presenting that reputation data to a plurality of users at the point of selection of websites. The search results display comprises a list 1601 of websites, with descriptive text information, each website having a reputation data 1600 describing a customer experience for persons using that website. Some of the websites are directly relevant to furniture, whereas others, found using the word 'chair', are irrelevant to furniture. In this example, the websites are listed in order of reputation, starting with the highest reputation in this example of 90%. The reputation data is downloaded by the web browser, at the same time as downloading the links from the search engine, and is displayed to a user at a user computer, so the user can select websites on the basis of reputation data.

Figure 17:
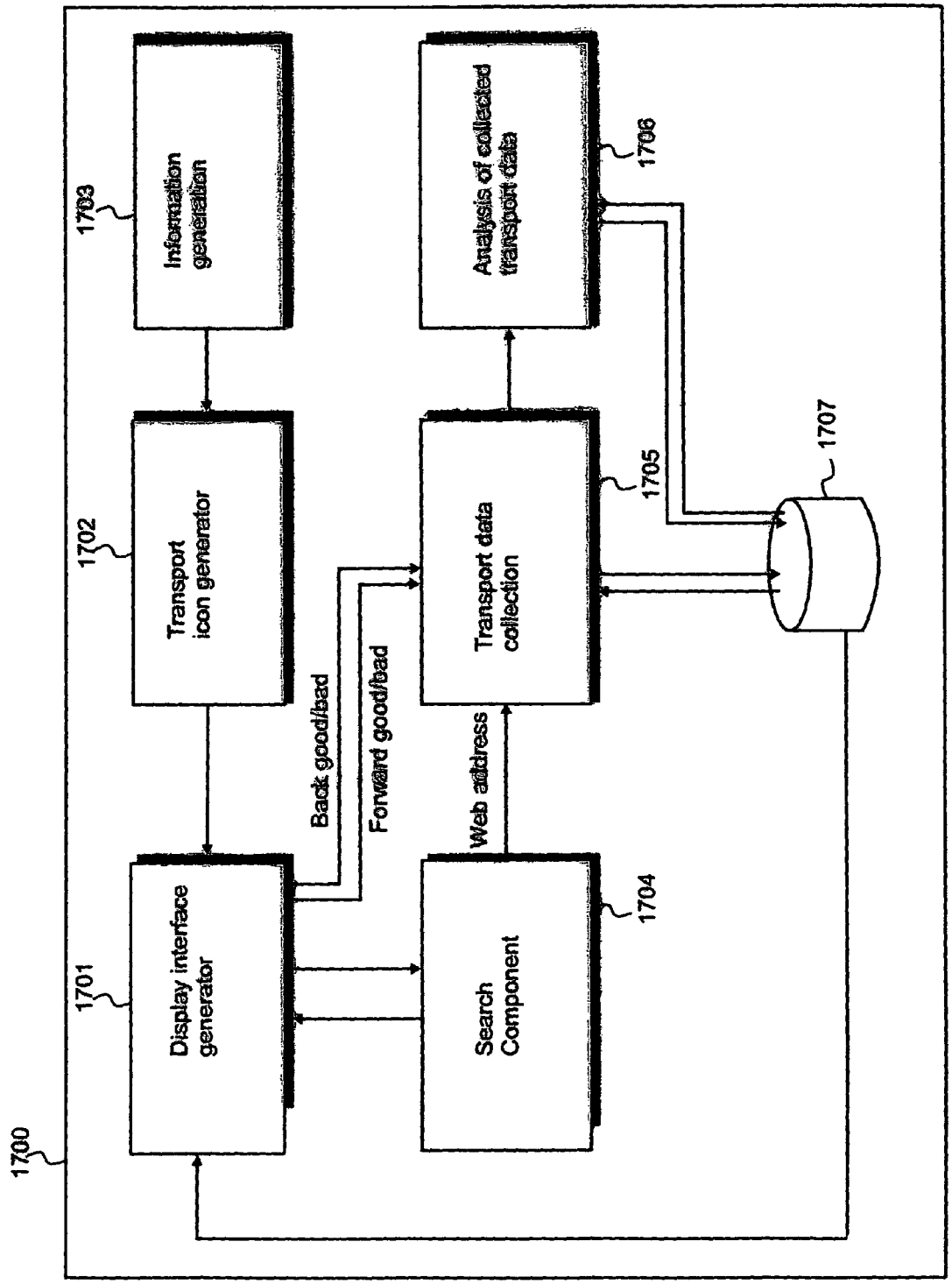
FIG. 17 illustrates schematically components of a search engine according to a second specific implementation of the present invention, adapted for collecting satisfaction data from a plurality of users of web sites, collecting and analyzing that satisfaction data and displaying a list of web sites along with an associated satisfaction data for each web site.

Referring to FIG. 17 herein, there is illustrated schematically components of the search engine shown in FIG. 15, for collecting opinion data, concerning a plurality of users opinions on a plurality of web sites found by the search engine, and for displaying that opinion data within a search result in response to a user request for a search. Search engine 1700 comprises a display interface generator 1701 for returning to the user both an initial search form and the search results page; a transport icon generator 1702 for generating forward and back transport icons; a semantic information generator 1703 for generating information labels in the form of text or graphics to be associated with the transport icons; a search component 1704, such as is well known in the art, for finding web sites on the internet; a transport data collection component 1705 for collecting data whenever a transport icon is activated; and an analysis component 1706 for performing an analysis of the collecting transport icon data and generating a satisfaction metric from the collecting transport icon data, describing how satisfied users are with the plurality of web sites.

Display interface generator 1701 is arranged to conventionally return to the user both an initial search form having a text data entry field for entering a key word to be searched, and then a search results page listing the search results. However, in addition the generator 1701 is arranged to incorporate transport icons of a first type, denoting a positive experience, and a second type denoting a negative experience, within a frame of the search results page along with associated scripts.

Transport icon generator 1702 generates the positive and negative type transporter icons.

A back icon of a first (positive type) and a back icon of a second (negative type) may be generated, and similarly a forward transport icon of a first (positive type) and a forward transport of a second (negative type) may be generated. Information generation component 1703 generates the text and/or graphics information which is displayed immediately adjacent a said transport icon. Information types may be as described herein before with respect to the first specific implementation.

Transport data collection component 1705 collects signals every time a transport icon is activated on the display screen generated by the display interface generator 1701. The transport data collecting component 1705 also receives an input from the search component 1704, of the web address which is currently being displayed. Therefore, the transport data collector 1705 can associate back positive, back negative, forward positive, and forward negative transport icon activation's with a particular web address, and stores this information in database 1707. Analysis component 1706 analyses the data stored in the database, and can generate a satisfaction rating information, for example a percentage satisfaction, determined by a set of algorithms, using the collected transport icon activation data stored in the database. For each web site, the analysis component 1706 may for example generate a single figure showing an overall user satisfaction rating, as illustrated schematically in FIG. 16 herein. This information can be fed back to the display interface generator, such that when a list of web sites is found by the search component 1704, the stored data is database 1707 for each web site for which the search engine has previously calculated the satisfaction data can be displayed as a list similarly as shown in FIG. 16, wherein in for each web site, an overall satisfaction rating is displayed along with the web address of that site.

It will be appreciated by the person skilled in the art that variations on the above embodiments are possible. As already indicated, the transport buttons may be provided within a webpage frame, rather than viewable on a browser; indeed, the transport buttons can be provided in frameless pages. Where the transport icons are provided in frameless web pages, the data collected from the forward and back transport icons on the website would be applicable only to that website, and may not be accessible by a centralized system, for example a search engine equipped to collect satisfaction or reputation data.

Of course, the transport icons can be any type of control element and are not limited to graphical icons—thus, the semantic information associated with a transport icon can be placed between standard anchor tags that include a hyperlink URL to produce an activatable transport control element.

Activation of a transport icon need not result in the viewed page being changed but can alternatively result in a jump within an existing page.

The number of transport items can vary from that described—thus, in one embodiment there could simply be two back transport icons, (one for 'good' and the other for 'bad'), whilst in another embodiment there could be three back transport icons (respectively representing reputations 'good', 'acceptable', 'bad'), three home-page transport icons (also respectively representing 'good', 'acceptable', 'bad'), and three forward transport icons (again respectively representing 'good', 'acceptable', 'bad').

The transport icons can be used in relation to any computer program application involving the navigation between or within documents (regardless of content type) and is not restricted to use with web browsers. Furthermore, the user computing entity on which the documents and transport icons are displayed can be any suitable device with adequate processing capability including mobile phones, PDAs (personal digital assistants), tablet PCs and the like.

The reputation information can be stored locally at the browser and not sent immediately to the final destination, the collected information subsequently being transmitted at any convenient point (such as when leaving a particular website to which the collected information relates or when the browser is closed). The collected information can, of course, be used locally and not sent anywhere.

The invention claimed is:

1. A method of obtaining user feedback relating to items displayable on a device, the method comprising:
    displaying on the device a view of a said displayable item, a first activatable transport-control element with associated first semantic information, and a second activatable transport-control element with associated second semantic information that is different from said first semantic information; and
    responding to activation of a said transport-control element both by moving the displayed item view within or between displayable items and by storing or outputting data indicative of the semantic information associated with the activated element, the item-view move that is effected as a result of activation of a said transport-control element being the same whichever of said elements is activated.

2. A method according to claim 1, wherein said displayable items are web pages, the device running a web browser for viewing the web pages.

3. A method according to claim 2, wherein the transport-control elements are displayed as part of the web browser interface, independently of a currently-displayed web page.

4. A method according to claim 3, wherein the semantic information is provided from externally of the device.

5. A method according to claim 2, wherein the transport-control elements are displayed as part of a currently displayed web page.

6. A method according to claim 1, wherein said semantic information comprises text data.

7. A method according to claim 1, wherein said semantic information comprises a graphics information.

8. A method according to claim 1, wherein said data comprises a first message type that is output every time said first transport-control element is activated, and a second message type that is output every time said second transport-control element is activated.

9. A method according to claim 1, wherein: said first semantic information comprises information describing a positive aspect; and said second semantic information comprises information describing a negative aspect.

10. A method according to claim 9, further comprising displaying a third transport control element with associated third semantic information describing a neutral aspect.

11. A method of obtaining feedback data from a plurality of users of one or more on line services, said method comprising:
    displaying a set of transport-control elements for transporting in a same direction between display views comprising said online service; and
    for each said transport-control element, presenting an associated information describing a type of experience which said user has encountered that is different from each other said transport-control element.

12. A user device arranged to obtain user feedback relating to items displayable by the device, the device comprising:
    a display; and
    a display control arrangement for displaying on the display a view of a said displayable item, a first activatable transport-control element with associated first semantic information that is indicative of a user's experience in respect of a displayed item, and a second activatable transport-control element with associated second semantic information that is indicative of a user's experience in respect of a displayed item and is different from said first semantic information;
    the control arrangement being arranged to respond to user activation of a said transport-control element both by moving the displayed item view within or between displayable items and by storing or outputting data indicative of the semantic information associated with the activated element, the item-view move that is effected as a result of activation of a said transport-control element being the same whichever of said elements is activated.

13. A device according to claim 12, wherein said displayable items are web pages, the display control arrangement comprising a web browser for viewing the web pages.

14. A device according to claim 13, wherein the browser is arranged to display said transport-control elements as part of the web browser interface, independently of any currently-displayed web page.

15. A device according to claim 14, wherein the device is arranged to receive said semantic information from externally of the device.

16. A device according to claim 13, wherein the transport-control elements are part of a currently displayed web page.

17. A device according to claim 13, wherein the control arrangement is arranged to send said data to an address associated with a website that provided the currently displayed page.

18. A device according to claim 12, wherein said semantic information comprises text data.

19. A device according to claim 12, wherein said semantic information comprises a graphics information.

20. A device according to claim 12, wherein the control arrangement is arranged to output said data as a first message type every time said first transport-control element is activated, and as a second message type every time said second transport-control element is activated.

21. A device according to claim 12, wherein:
said first semantic information comprises information describing a positive user experience; and
said second semantic information comprises information describing a negative user experience.

22. A device according to claim 21, wherein the control arrangement is further arranged to display a third transport control element with associated third semantic information describing a neutral user experience.

23. A device according to claim 12, wherein said information describing a user's experience is selected from the set comprised of:
information determining whether a user found/did not find what-they wanted;
information describing whether a user had a good/bad experience; and
information describing whether a user had a satisfactory/unsatisfactory experience.

24. A computer-readable medium encoded with a computer program for causing a computing entity to operate to:
display on the computing entity a view of a displayable item, a first activatable transport-control element with associated first semantic information, and a second activatable transport-control element with associated second semantic information that is different from said first semantic information; and
respond to activation of a said transport-control element both by moving the displayed item view within or between displayable items and by storing or outputting data indicative of the semantic information associated with the activated element, the item-view move that is effected as a result of activation of a said transport-control element being the same whichever of said elements is activated.

25. A computer-readable medium encoded with a computer program according to claim 24, wherein said semantic information comprises text data.

26. A computer-readable medium encoded with a computer program according to claim 24, wherein said semantic information comprises a graphics information.

27. A computer-readable medium encoded with a computer program according to claim 24 in the form of a web browser product for displaying web pages that constitute said items.

28. A computer-readable medium encoded with a computer program according to claim 24, wherein said data comprises a first message type that is output every time said first transport-control element is activated, and a second message type that is output every time said second transport-control element is activated.

29. A computer-readable medium encoded with a computer program according to claim 24, wherein:
said first semantic information comprises information describing a positive aspect; and
said second semantic information comprises information describing a negative aspect.

30. A computer-readable medium encoded with a computer program according to claim 24, further comprising causing the computing entity to operate to display a third transport control element with associated third semantic information describing a neutral aspect.

31. A web page stored on a storage medium, the web page comprising:
page content data, a first activatable transport-control element with associated first semantic information, a second activatable transport-control element with associated second semantic information that is different from said first semantic information, the transport-control elements and their associated semantic information being intended for display by a browser along with said page content data; and
control script code for causing a browser, when displaying the web page, to respond to activation of a said transport-control element both by moving the displayed page view within or between web pages and by storing or outputting data indicative of the semantic information associated with the activated element, the page-view move that is effected as a result of activation of a said transport-control element being the same whichever of said elements is activated.

32. A web page according to claim 31, wherein said semantic information comprises text data.

33. A web page according to claim 31, wherein said semantic information comprises a graphics information.

34. A web page according to claim 31, wherein said script code is arranged to cause the browser to output, as said data, a first message type every time said first transport-control element is activated, and a second message type every time said second transport-control element is activated.

35. A web page according to claim 31, wherein:
said first semantic information comprises information describing a positive aspect; and
said second semantic information comprises information describing a negative aspect.

36. A web page according to claim 35, wherein the script code is further arranged to cause the browser to display a third transport control element with associated third semantic information describing a neutral aspect.

37. A web page according to claim 31, wherein said page is divided into at least a first frame containing said transport-control elements with their associated information, and a second frame containing said content data.

38. A web page according to claim 31, wherein the storage medium is a web server.

39. A web server including processing means arranged to generate a web page comprising:
page content data, a first activatable transport-control element with associated first semantic information, a second activatable transport-control element with associated second semantic information that is different from said first semantic information, the transport-control elements and their associated semantic information being intended for display by a browser along with said page content data; and
control script code for causing a browser, when displaying the web page, to respond to activation of a said transport-control element both by moving the displayed page view within or between web pages and by storing or outputting data indicative of the semantic information associated with the activated element, the page-view move that is effected as a result of activation of a said transport-control element being the same whichever of said elements is activated.

40. A service provider computer entity adapted for providing an online accessible service, said computer entity comprising:
a web server application capable of serving website pages to a plurality of user browsers; and
a message generation component for, upon activation of a transport-control element of the browser, causing the passing to a said browser requesting a website page, one of a plurality of information items associated with respective ones of a plurality of such transport-control elements of the browser, respective ones of said information items describing a positive aspect and a negative aspect of an experience of the website page served by said computer entity.

41. A computer entity according to claim 40, wherein said information comprises a text description of a positive information type and a text description of a negative information type.

42. A computer entity according to claim 40, wherein said information comprises a graphical representation of a positive type and a graphical representation of a negative type.

43. A computer entity according to claim 40, wherein said information comprises information selected from the set comprised of information constructed for eliciting an objective response; and information constructed for eliciting a subjective response.

44. A computer entity according to claim 40, wherein said web server application is arranged to provide the information generated by the message generation component to the requesting browser in association with the requested web page.

\* \* \* \* \*